United States Patent [19]

Häfner et al.

[11] Patent Number: 4,770,050
[45] Date of Patent: Sep. 13, 1988

[54] FORCE OR PRESSURE MEASURING DEVICE

[75] Inventors: Hans W. Häfner, Aichach-Walchshofen; Günther Bock, Friedberg-West, both of Fed. Rep. of Germany

[73] Assignee: Pfister GmbH, Augsburg, Fed. Rep. of Germany

[21] Appl. No.: 934,961

[22] Filed: Nov. 25, 1986

Related U.S. Application Data

[63] Continuation-in-part of Ser. No. 680,126, Dec. 10, 1984, Pat. No. 4,644,805, and a continuation-in-part of Ser. No. 907,771, Dec. 10, 1985.

[30] Foreign Application Priority Data

Dec. 10, 1984 [EP] European Pat. Off. ........ 84115029.5
Dec. 10, 1984 [DE] Fed. Rep. of Germany ....... 3444996
Jun. 18, 1986 [DE] Fed. Rep. of Germany ....... 3620360
Jul. 30, 1986 [DE] Fed. Rep. of Germany ....... 3625842

[51] Int. Cl.$^4$ .............. G01L 1/22; G01L 5/00; G01L 7/16; G01L 9/08
[52] U.S. Cl. .............................. 73/862.68; 73/746; 73/862.65; 73/DIG. 4; 338/2; 338/4
[58] Field of Search .......... 73/862.68, 862.65, 862.64, 73/862.38, DIG. 4, 768, 777, 745, 746; 177/211, 210 R; 338/5, 2, 4; 310/345; 29/454, 610 SG

[56] References Cited

U.S. PATENT DOCUMENTS

| | | | |
|---|---|---|---|
| 1,994,388 | 3/1935 | Erichsen | 265/1 |
| 3,269,174 | 8/1966 | Linville | 73/88.5 |
| 3,410,135 | 11/1968 | Reynaud | 73/862.38 |
| 3,582,691 | 6/1971 | Sonderegger | 310/8.4 |
| 4,127,788 | 11/1978 | Daugherty | 310/328 |
| 4,175,429 | 11/1979 | Keck | 73/141 A |
| 4,383,584 | 5/1983 | Dyck | 177/208 |
| 4,644,805 | 2/1987 | Hafner | 73/862.68 |

FOREIGN PATENT DOCUMENTS

0516321 4/1921 France .

Primary Examiner—Donald O. Woodiel
Attorney, Agent, or Firm—Armstrong, Nikaido, Marmelstein & Kubovcik

[57] ABSTRACT

Force or pressure measuring device. Between a support member and a force or pressure introduction member elastomeric material is provided which strongly adheres to the two members and is in contact with at least one pressure sensor. With a preferred embodiment the support member is in a potlike form while the force or pressure introduction member is in the form of a piston received by the support member and forming a very narrow gap to the cylindrical surface thereof which gap is essentially completely filled by said elastomeric material.

20 Claims, 7 Drawing Sheets

FORCE OR PRESSURE MEASURING DEVICE

This application is a continuation-in-part of application Ser. No. 680,126, filed Dec. 10, 1984, now U.S. Pat. No. 4,644,805, and application Ser. No. 907,771, filed Dec. 10, 1985.

TECHNICAL FIELD

The present invention relates to a force or pressure measuring device for measuring a force or pressure exerted to force or pressure introduction member arranged in a spaced relationship to a support member the space therebetween being filled with elastomeric material in contact with a pressure sensor.

BACKGROUND ART

The U.S. Pat. No. 3,410,135 discloses a force measuring device where at the bottom of a potlike base member an elastomeric block is arranged having a slightly raised peripheral lip. A force introduction piston having a remarkably smaller diameter than the cylindrical interior of the base member fits with its lower face edge into the recess formed by the raised lip. The gap between the peripheral surface of the piston and the cylindrical inner surface of the base member is relatively large and of such width that upon application of a force no elastomeric material is squeezed out of the base member by the piston. In view of the relatively large gap the piston may assume a certain oblique position with respect to the cylindrical interior on the base member without engaging the surface of the latter. In order to limit such an oblique position of the piston a resilient washer may be provided in the upper region of the annular gap between the piston and the interior surface of the base member. There is no connection between the elastomeric material and the metallic surfaces of the base member and the piston in contact with the elastic material. Without the washer considerable lateral forces will be transmitted to the elastomeric material and cause misreadings of the force measured.

With the washer provided a new member of friction is introduced which in turn deteriorates the measuring results. Since the annular gap is relatively wide elastomeric material will be pressed into it at least upon application of large forces which gives rise to further inaccuracies of the measurement.

The U.S. Pat. No. 4,175,429 discloses a force measuring device comprising a pressure sensitive metal wire embedded in block of vulcanized silicon rubber provided at the bottom of a cylindrical recess in a base member and compressible by means of a movable piston acting as a force introduction member onto the silicon rubber. A considerable space is allowed between the interior cylindrical wall of the base member and the peripheral surface of the piston. In order that a clearance may be maintained as large as possible a sealing ring is provided at the edge of the lower face surface of the piston in contact with the silicon rubber. The sealing ring is in contact with the cylindrical surface of the interior of the base member which results in a considerable friction affecting the accuracy of the force measuring device. Furthermore, any lateral force component of a force applied at an oblique angle onto the force introduction member acts at least partially onto the elastomeric material which agian deteriorates the accuracy of measurement.

The U.S. Pat. No. 3,269,174 discloses a stress sensor comprising a thermistor embedded in block of elastomeric material. When applying forces or pressures at this block there is a temperature increase therein detected by the thermistor and evaluated for force or pressure determination. The response of this known stress sensor is too slow for most practical applications.

The U.S. Pat. No. 4,127,788 discloses a device for detecting deformations in mine roofs wherein an open cylindrical casing having inner and outer threaded surfaces is threaded into the mine roof. A piezo-electric cristal is mounted within the casing to sense the deformation and stresses in the mine roof. The piezoelectric cristal is embedded in a epoxy resin. This device is not adapted for force or pressure measuring purposes since the threaded fixture of the block of resine results in a non-linear inaccurate response.

Among prior publications which are directed to such force or pressure measuring devices are the following publications:

G.J. Dyck, U.S. Pat. No. 4,383,584, May 17, 1983
A.M. Erichsen, U.S. Pat. No. 1,994,388, Mar. 12, 1935
R.N. Daugherty, U.S. Pat. No. 4,127,788, Nov. 28, 1978
H.C. Sonderegger, U.S. Pat. No. 3,582,691, June 1, 1971
M.K. Gauldie, French Pat. No. 516,321, Apr. 16, 1921
J. Leonhardt, DE Pat. Pub. No. P2,106,193, Aug. 24, 1972

DISCLOSURE OF THE INVENTION

It is an object of the invention to provided a force or pressure measuring device having a simple design and excellent operaling parameters.

It is another object of the present invention to provide a force measuring device which is insensitive to lateral force components whilst exactly measuring the vertical force component of a force applied to the force introduction member at an oblique angle.

The object of the present invention is provide a pressure measuring device adapted for measuring very high pressures in the range of hundreds of tons.

Still another object of the present invention is to provide a pressure measuring device which is shock protected and resistent against chemical influences.

These and other objects of the invention are achieved by the device as defined in the appended claims.

DETAILED DESCRIPTION OF THE EMBODIMENTS OF THE INVENTION

Figure 1:
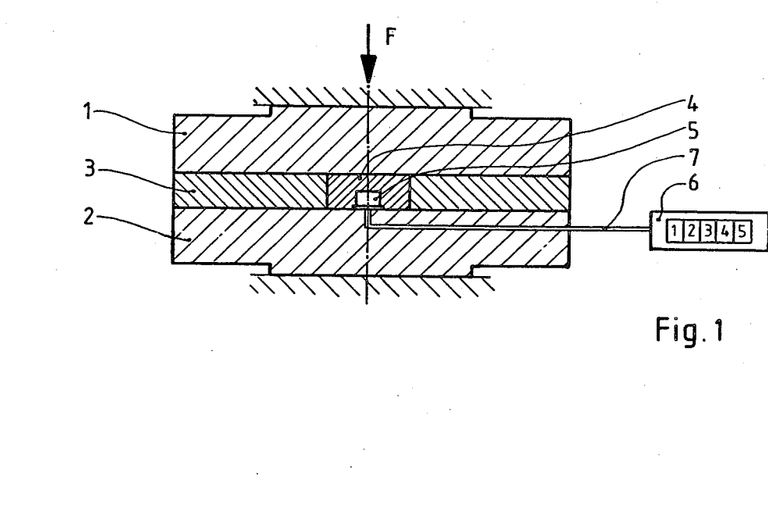
FIG. 1 shows the principle design of a force measuring device according to the invention in a vertical sectional view.
Figure 2:
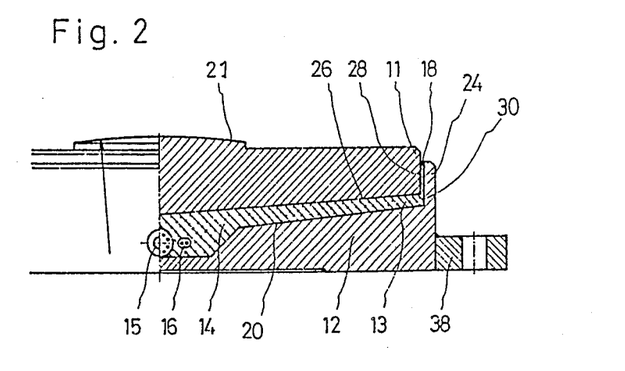
FIG. 2 is a side view partially in section illustrating a force measuring device produced with an apparatus according to FIG. 5.
Figure 3:
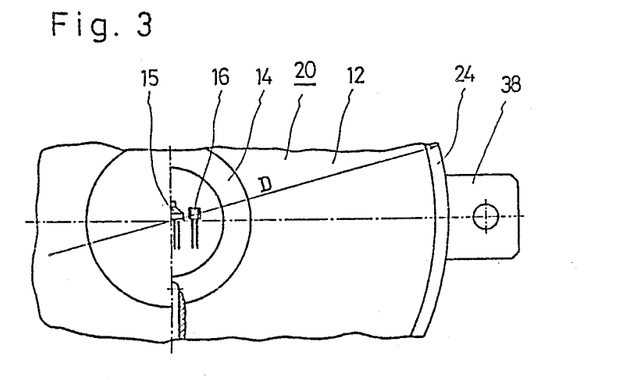
FIG. 3 is a top view of the force measuring device of FIG. 2.

FIG. 1 shows the principle design of a force measuring device according to the invention in a vertical sectional view and FIGS. 2 and 3 show a vertical sectional view and a plan view, respectively, of a force measuring device as designed for practical use. According to FIG. 1 an elastomeric material 3 is arranged between two members 1, 2, opposite face surfaces of which are in a parallel arrangement to each other. Basically no connection between the members 1, 2 and the elastomeric material 3 would be necessary since there is no sealing necessary. However, according to the invention the elastomeric material 3 is secured at the opposing face surfaces of the members 1, 2 either by an adhesive or by vulcanization.

Within the elastomeric material there is provided a pressure sensor which, as an example, may be a piezoelectric or piezoresistive pressure transducer 5 which converts pressure into an electrical signal. The pressure transducer 5 is connected via an electrical conductor 7 to a pressure measuring and indicating apparatus 6. This apparatus may comprise a digital voltmeter which receives the force-proportional signal from the pressure transducer 5.

In one embodiment of the force measuring device according to the invention the piezoelectric pressure transducer 5 is embedded in a material 4 contained in a recess in the elastomeric material 3 and which has a higher viscosity than the latter material.

The material 4 may be a gel like silicon. If a force F is exerted normal onto force introduction member 1 preferably consisting of metal, such a force is transferred to the elastomeric material 3 which transmits this force to the piezoelectric pressure transducer 5 in a pressure proportional manner.

The piezoelectric pressure transducer may be replaced by a strain measuring gauge connected in a Wheatstone bridge or any other appropriate pressure sensor.

Alternatively, the pressure exerted to the elastomeric material 3 may be transferred to a corresponding measuring and indicating apparatus by filling the recess in the elastomeric material 3 with a liquid and having this liquid exerting the pressure via a liquid lead 7 directly to the measuring and indicating apparatus which then provides a direct hydraulic indication.

In situations where forces are exerted non-uniformly onto the upper surface member 1, several pressure transducers may be distributed in the elastomeric material 3. The members 1 and 2 or at least member 1 may have then a considerable surface, for instance in accordance with the dimension of a truck. The pressure transducers would then be distributed in a matrix array over such a force measuring carpet. The signals derived from the pressure transducers will then be supplied to an evaluation apparatus which calculates the exerted total force and indicates the latter.

Particular fields of the application of the force measuring device according to the invention are measuring the weight of very large containers or the load exerted onto the wheel or axle of a truck or other vehicle.

Furthermore, the force measuring device according to the invention is particularly adapted for use in connection with platform scales for trucks or street cars.

The pressure measuring device according to the invention may exemplary be used for measuring the pressure of gases or liquids or pourable materials stored in large containers, bins or bunkers.

A practical embodiment of a force measuring device manufactured according to the method of the invention is shown in FIGS. 2 and 3. Between an upper member 11 and a base member 12 there is provided elastomeric material 13 into which a pressure transducer or sensor 15 and associated resistors 16 for temperature compensation are embedded. By means of a flange 38 the base member 12 may be secured to a base or support (not shown) whilst the force is exerted to the upper surface of the upper member 11 which may be provided with a spherical region 21.

According to this embodiment the region formed between the two opposing inner sufaces of the members 11 and 12 has a more specific form. In particular, the lower surface 26 of the upper member 11 has a slightly convex or conical shape. The upper surface 20 of the base member 12 may be formed convex resulting in a flat cup-like form. A broadened recessed central region 14 serves for the arrangement of the pressure sensor 15 and the compensation resistors 16. Furthermore, the base member 12 is provided with an upwardly extending peripheral rim 24 for insertion of the upper plate 11. The dimensions are such that between the outer peripheral surface 28 of the upper member 11 and the cylindrical inner surface 30 of the rim 24, there is only a very narrow circular gap 18 which in accordance with the dimensions of the embodiment shown in FIGS. 2 and 3 is in the order of 0.1 to 2 mm preferable in the region between 0.2 and 1mm. The narrow gap width has the advantage that the force measuring device has a high rigidity resulting in a rapidly dampening of osicillations. Also, the temperature sensitivity is reduced.

For optimizing the operation of the force measuring device, according to the invention, the height of the gap 18 may be of importance. This gap height should not be too small since via the two opposing surfaces 28 and 30 often considerable lateral forces will have to be transmitted.

By optimizing the gap 18 the influence of the temperature dependent spring characteristic of the silicone rubber may be minimized by a simultaneous reduction of measurement deflection which may be in the order of 0.01 mm. Also, a high stability against lateral forces is achieved.

By designing the upper member 11 in the form of a swimming body the effect of self alignmenr upon asymmetric loading is enhanced. With a force measuring device having dimensions as shown in FIG. 2, the height of the gap 18 may be in the order of 10 to 30 mm, Preferably between 15 and 20mm. The dimensions of the members 11 and 12 and the interspace between them filled with the elastomeric material are considered to be the dimensions of a preferred embodiment and these dimensions are made part of the description whilst deviations from these dimensions are in the option of a person skilled in the art.

With the embodiment according to FIGS. 2 and 3 as a pressure sensor an absolute pressure sensor is used, for instance the absolute pressure sensor KPY 14 manufactured by Siemens AG, Munich (FRG). This absolute pressure sensor 15 is embedded in the elastomeric material 13 in such a manner that there is no essential contact of the absolute pressure sensor 15 to either of the members 11 and 22. This results in a uniform pressure distribution and a good protection of the absolute pressure sensor, the compensation resistors and the cable against enviromental influences in particular against penetration of gases and humidity. Thus, such a force measuring device may be used in an underwater environment.

As elastomeric materials 13 natural or synthetic materials may be used with a shore hardness in the range between 30 and 70 preferably 40 and 60. As an example for an elastomeric material 13 the silicone-rubber RTV-ME 625 of Wacker-Chemie AG, Munich (FRG) may be used.

A high uniformity and incompressibility of the elastomeric material are achieved in that air and gas bubbles are removed from the elastomeric material before or during the hardening thereof by the procedure according to the invention.

Figure 5:
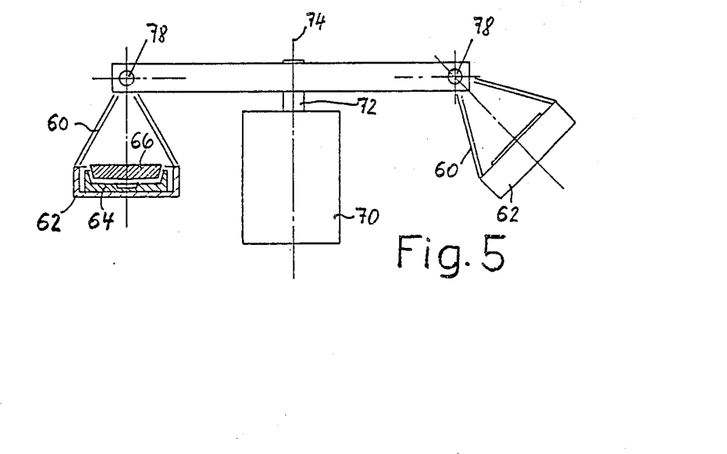
FIG. 5 a schematic diagram of an apparatus used for producing force measuring devices according to the invention.

FIG. 5 is a sideview of an exemplary embodiment of the apparatus according to the invention showing to the left the apparatus in rest position and to the right in operating position.

It should be noted that for implementing the procedure according to the invention various apparatuses could be used adapted to apply a sufficient acceleration for sufficient time to the synthetic material. Accordingly, the apparatus according to FIG. 5 is an exemplary preferred design just shown in principle.

FIG. 5 shows a motor 70 which is adapted to rotate its shaft 72 about a vertical axis 74. For the present embodiment the shaft 72 supports at a central position a horizontal beam 76. In principle a one-arm-arrangement would be sufficient or for mass production a carrousel type of apparatus having a plurality of starlike arranged beams may be used. At the ends of the beam 76 support members 62 are fixed at pivotal points 78 by means of wires, cords or rigid connection bars like an apothecaries' scale. The support members 62 may comprise moulds for one or several of the synthetic bodies to be fabricated or may consist of a plate for putting one or several moulds 64 onto it which are filled with the synthetic resin.

Upon energisation of the motor 70 the rotation of its shaft 72 causes the support members 62 to pivot from the rest position shown on the left hand side of FIG. 5 into a position exemplary shown on right hand side of FIG. 5. With increasing rotational speed the support members 62 are lifted more and more in view of the resultant of gravitation and centrifugal force.

Preferably, this centrifugal procedure is initiated soon after mixing of the two or several components of the synthetic material together and filling the mixture into the mould. Thus, the mixture is more or less in liquid form and the pressure created in the mixture presses the essentially lighter air bubbles out of the synthetic material and the mould.

Dependent on the material and the progress of the hardening accelerations of a multiple of g (acceleration of gravity) up to 100 may be applied to the material. The desired accelerations may be calculated on the basis of the rotational speed and the dimensions of the beam 76 and the cords 60. Alternatively the angular position of the support members 62 in respect of the horizontal direction at predetermined rotational speeds in test runs may be used for determining the acceleration.

As mentioned before the duration of the centrifugal process may be determined by means of simple test runs.

The effect of the centrifugal process may be improved by covering the mould 64 or the moulds on the support member 62 by placing a top member onto the material which essentially covers the material whilst air bubbles may be pressed out through a gap consisting between the rim of the would and the peripheral edge of the top member 66.

With the apparatus according to this embodiment a force measuring device may be fabricated including a base member 64 provided with an upward projecting rim. The synthetic material to be hardened is exemplary silicon - rubber, RTV-ME 6 25 of Wacker Chemie AG Munchen (FRG). After pouring the mixture consisting of the base material and a hardening agent into the base part 64 acting as the bottom mould part, the top plate 66 is inserted which leaves a gap between the rim of the base part 64 and the peripheral surface of the top part 66. With an acceleration between 30 and 60 × g all air bubbles are pressed out of the elastomeric material in a very short time between several seconds and one minute.

If a mould is used which is essentially closed it will be preferably to provide an air escape opening. Alternativly the most upper layer of the material may be removed for instance cut away or ground away which layer will include all air bubbles in case the air is not completely accumulated above the synthetic material.

It should be noted that with such a centrifugal process also other particles having a density different from that of the synthetic material may be removed such that the resulting body will be extremely pure and uniform. Heavier particles would be forced to the bottom of the mould and can be removed there by removing the bottom layer of the body.

After the centrifugal process the material may complete hardening in rest in case the hardening is not yet completed during the centrifugal process. It should be noted, that the hardening may be enhanced by putting the moulds with the reacting mixture into an oven for applying an increased temperature. In addition, during rotation heeting could be applied to the mould(s) if desired as explained in German Patent No. 25 37 262.

For producing force measuring devices according to FIGS. 2 and 3 the method explained before is applied as follows:

In view of the cuplike form the base member 12 may be used as the mould for the elastomeric material which considerably simplifies the production of the force measuring devices. First, the two (or more) reactant components of the elastomeric material are mixed by stirring in a well-known manner and a proper quantity of the mixture is poured into the base member 12 upon having arranged the pressure sensor 15 and the compensation resistors 16 in the latter. The base member is now placed onto the apparatus of FIG. 5 and rotated with a predetermined rotational speed for a predetermined time. The rotational speed and the time may be selected such that all air or gas bubbles are squeezed out of the reacting mixture. The two parameters will further depend on the type of elastomeric material used and at what a time after initiating hardening of the mixture has elapsed;a typical rational speed might be in the order of 50 to 500 rpm., preferably between 150 and 400 rpm.. The time period may vary between several seconds and several minutes, preferably in the range about one minute.

Although such a centrifugal process may be accomplished without placing the upper member 11 onto the base member 12 such a measure supports the pressure onto the elastic material resulting in a faster removal of air or gas bubbles which removal is further enhanced by the above mentioned convex shape of the lower surface of the upper member 11. Furthermore, with the upper member 11 in inserted position the force measuring device is already completed in its final form with the hardening mixture of the elastomeric material completely filling the gap between the upper member 11 and the base member 12.

An improved force measuring cell results from wetting all parts of the upper member and the base member coming into contact with the elastomeric material with an agent containing in a solvent, for instance aceton or toluene, silanes or silicon resines. Such a primer, exemplary primer G 790 manufactured by Wacker-Chemie GmbH Munich (FRG) ensures that the elastomeric material fixedly adheres to the metallic surfaces of the upper member and the base member. As result, there is no danger of penetration of humidity or dirt and lateral forces acting on the upper member are transferred to the base member through the elastomeric material in the gap without friction.

Figure 4:
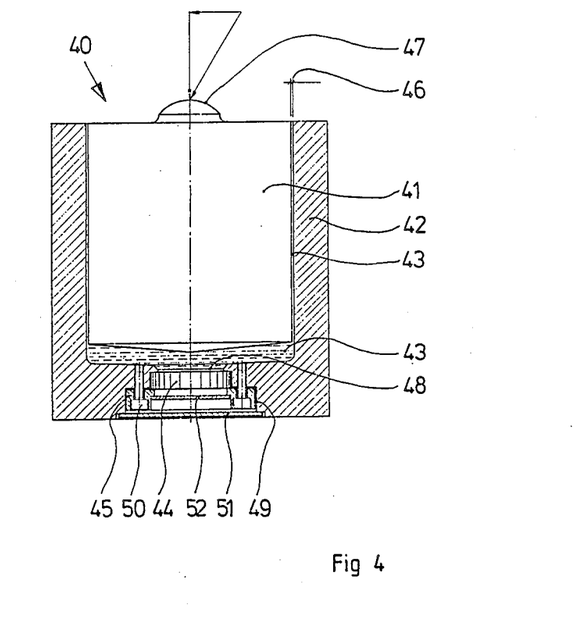
FIG. 4 is a side view partially in section of a second embodiment of a force measuring device produced in accordance with the method of the invention.

FIG. 4 shows a further embodiment of a force measuring device preferably produced by using the method according to the invention. In FIG. 4 load cell 40 includes a potlike base member 42 having a relatively high cylindric side wall. In the interior of the base member 42 a force introduction member specifically a force transmission piston 41 is provided at the upper face of which a spheric section may be provided for force introduction. The lower face of the piston 41 may be formed slightly convex or conical for enhancing removement of air bubbles when applying the method according to the invention. Between the lower face of the piston 41 and bottom of the base member 42 elastomeric material 43 is shown which preferably is a silicon rubber, exemplary RTV-ME 6 25 or RTV-ME 6 22 manufactured by the Wacker-Chemie GmbH Munich (FRG). Alternatively, any other elastomeric material mentioned before may be used. Silicon rubbers are preferred in view of the their exellent temperature constancy in a range between −100° C. bis +200° C. Furthermore, they are resistant against ozone and light influence as well as against oil .

In the bottom wall of the base member 42 there is at least one opening preferably a central opening 48 into which a pressure sensor 44 may be inserted and fixed by means of a ring 45. Specifically, after inserting the pressure sensor 44 from below the ring 44 is placed into a recess 49 at the bottom face surface of the base member 42 and exemplary fixed by means of screws 50 at the bottom wall of the base member 42. Finally, a cover plate 51 is bonded or otherwise fixed at the bottom face surface for an air and humidity tight connection.

One of the salient features of the embodiment of FIG. 4 is the relatively narrow and extremely high gap 46 between the peripheral surface of the piston 41 and the interior surface of the base member 42. Preferably, this gap is in the range of 0.05 to 2 mm , preferably 0.1 to 1 mm whilst its height is in the range of the diameter of the piston 41.

Compared with the embodiment according to the FIGS. 2 and 3 the load cell 40 according to FIG. 4 is adapted for use in connection with forces which have considerable lateral components which with the embodiment according to FIGS. 2 and 3 will tend to tilt the upper member in an oblique position which might lead to the blocking of its movement in vertical direction or at least to considerable friction. Considering the load cell 40 according to FIG. 4 an oblique force acting upon piston 41 is divided in a force component acting in direction component acting perpendicularly to the vertical component as a lateral force component. The latter is bypassed through the elastomeric material 43 in the gap 46 and the base member 42 into the base support (not shown). The vertical component causes in the elastomeric material 43 below the lower face of the piston 41 a pressure proportional to the vertical component, which pressure is captured by the pressure sensor 44.

The high, narrow gap 46 has the further advantage of an increased rigidity in load direction (smaller 0.01 mm ) and offers the use of load cells 40 for extreme loads in the range of 1000 tons and more and an interior pressure up to 500 bars. The load cells 40 have a very compact size. For producing load cells 40 according to the method of the invention first all metalic surfaces of the base member 42 and the piston 41 which will come into contact with the elastomeric material 43 will be treated with an adhereing agent as explained in connection with the embodiment of FIG. 2 and 3 in order to ensure a definite connection of the elastomeric material 43, in particular in the gap 46, to the surfaces of the piston the base member 42.

The opening 48 in the bottom wall of the base member 42 may be closed by the inserted pressure sensor 44 or by a plate of similar size. As described before a mixture of two (or more) reactant components of the elastomeric material are mixed together and a poper amount of the mixture is poured into the interior of the base member 42. For removing all air bubbles the device is placed onto the apparatus of FIG. 1 and rotated for a time period which might even be below one minute with a rotational speed of exemplary 300 rpms. assuming that the device is arranged at a distance from the rotational axis of about 500 mms. Upon stopping the apparatus piston 41 is inserted and there is a second centrifugal step similar to the first step removing the rest of air bubbles and having the elastomeric material 43 rising into the narrow gap 46 up to the upper edge of the base member 42. Such the gap 46 will be completely filled with the elastomeric material 43 which will fixedly adhere to the surfaces of the piston 41 and the base member 42 due to the primer treatment mentioned before.

Alternatively, the two step procedure may be replaced by a one step procedure by inserting the piston 41 immediately after pouring the mixture into the interior of the base member 42. Thus, only one centrifugal step is necessary. After this one centrifugal step or after the second step the device is maintained in rest for completing hardening (provided that the hardening has not yet been finished during the centrifugal step (s) ).

Now, if the pressure sensor 44 was not placed into the opening 48 at the beginning of the process, the plate closing this opening is removed and a pressure sensor 44 is inserted which has been calibrated and compensated separately from the load cell 40.

It should be noted, that this feature of a separately and replaceably attaching of the pressure sensor 44 to the load cell 40 is of considerable advantage since the pressure sensor 44 may be calibrated and compensated by corresponding compensating resistors separately and individually without using the load cell 40. Electrical parts necessary, in particular the compensating resistors may be applied to a board 52 arranged below the pressure sensor 44 or to the bottom face surface of the pressure sensor 44 by a conventional thick layer technique. Alternatively, an intelligent pressure sensor might be used having integrated calibration and compensation means. Obviously, the pressure sensor 44 is connected by a cable (not shown) to appropriate evaluation means well-known in the art.

It should be appreciated that the embodiment according to FIG. 4 is the best mode for carrying out the invention in particular when vertical force components are to be measured of forces which act upon the force introducing member at an oblique angle to the vertical direction.

Whilst the method according to the invention is the best mode for producing the force measuring devices of the type described before other procedures for removing air bubbles from elastomeric material may be used as applying vacuum to the elastomeric material as it is known in the art.

Figure 6:
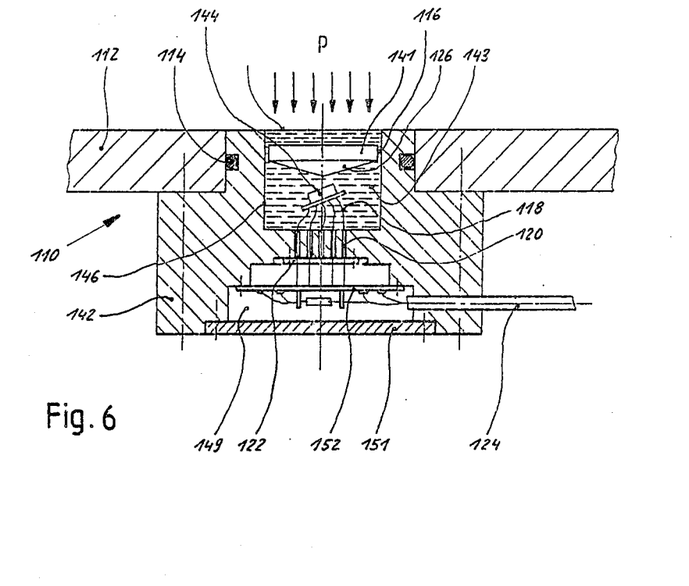
FIG. 6 is a schematic sectional side view of a first embodiment of a pressure measuring device according to the invention.
Figure 7:
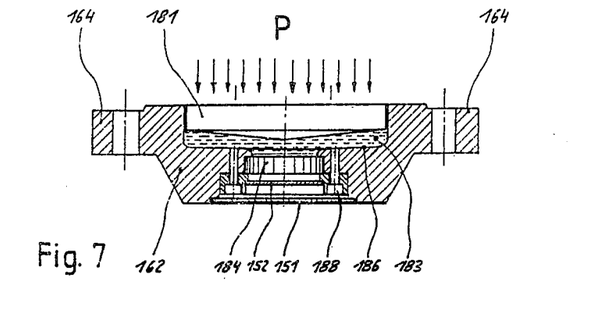
FIGS. 7 are schematic sectional side views of modifications of and 8 the pressure measuring device according to FIG. 6.
Figure 8:
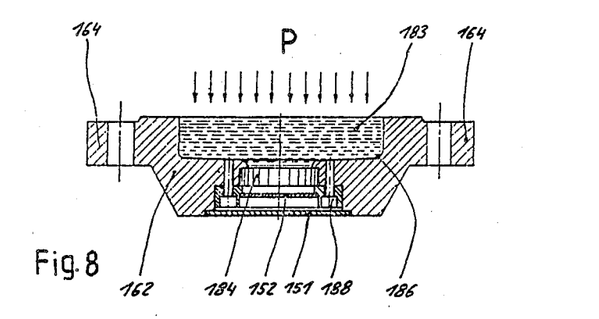

As mentioned before, a force measuring device according to the invention is ideally adapted for measuring pressures, too. FIGS. 6 to 8 show embodiments which are particularly designed for this purpose. Generally, these pressure measuring devices are designed for sustaining very high pressures with very reasonable accuracy for use in extremely rough environment, protecting the minute pressure sensors used very well against shocks and chemical influences.

FIG. 6 shows a first embodiment of a pressure measuring device 110 according to the invention having a very solid rigid housing 142 preferably made of metal or ceramic material, the housing being secured by interposing suitable sealings 114 to a container, a pipe or the like 112, the top surface of the housing flushing with the interior surface of the container. The housing 142 may be secured to the container 112 by suitable securing means, exemplary screws, at the exterior surface of the wall of the container 112.

Again, the housing 142 has a potlike shape, being provided with a cylindrical recess 144 the size of which is a multiple of the diameter of a pressure sensor 144 arranged in the recess 146. Preferably the diameter of the recess 46 is more than ten times of the diameter of the pressure sensor 144.

The recess 146 is essentially filled with a bubblefree elastomeric material 143 which exemplary may be silicone rubber. With the embodiment according to FIG. 6 the pressure sensor 144 is completely embedded in the elastomeric material 143, connection leads 118 of the pressure sensor 144 extend within the elastomeric material 143 through holes 120 in the bottom of the housing 142 to a circuit board 152 mounted in a bottom side recess 149 in the housing 142. With the housing 142 being made of metal the holes 120 are isolated by ceramic tubes secured by an insulating plate 122 mounted at the bottom side of the housing 142.

By means of a cable 124 secured in the housing 142 a breakproof output connection is provided for the electric signals generated by the pressure sensor 144. A cover plate 151 secured to the bottom side of the housing 142 ensures tight isolation of the interior of the recess 149 against environment.

In operation, a pressure P acts onto a piston area formed by the top side 145 of the elastomeric material 143 the pressure P being uniformly transmitted by the elastomeric material 143 to the pressure sensor 144.

Though the recess 146 may be completely filled by the elastomeric material 143 with the embodiment according to FIG. 6 a piston 141 is inserted into the recess 146 forming a narrow gap 116 with the cylindrical interior surface of the recess 146 and filled with elastomeric material. The piston 141 may either be embedded in the elastomeric material 143 as shown in FIG. 6 or its top surface may flush with a top surface 145 of the elastomeric material 143 and with the interior surface of the container 12 respectively (see also FIG. 7).

The piston 141 protects the elastomeric material 143 from mechanical or chemical influences particular in cases where the pressure measuring device is used in connection with particulate pourable material. This is enhanced by the alignment of the container wall, the top surface of the housing and the top surface of the elastomeric material 145 or of the piston 141.

It should be noted that in view of the elastomeric material 143 in the gap 116 the piston 141 is guided in the recess 146 essentially frictionless. Thus, the pressure P is completely transmitted by the piston 141 to the pressure sensor 144 which preferably may be of the type of a pressure sensor semiconductor. The hermetic embedding of the pressure sensor within the bubblefree elastomeric material avoids critical securing and supporting of the pressure sensor securing means at the housing or the container. This enables the measurement of extremely large pressures. In view of the excellent resistance of silicone rubber to chemical substances and with an appropriate selection of material for the piston 141 and the housing 142 which are preferably made of cheramic or stainless steel pressures may be measured even in very agressive fluids.

It should further be noted, that the provision of the piston 141 assists the removal of air bubbles out of the elastomeric material especially when the pressure measuring device is manufactured according to the method described in connection with FIG. 5.

FIGS. 7 and 8 show further embodiments of a pressure measuring device according to the invention which differ from the embodiment according to FIG. 6 in the fact that the pressure sensor is not fully embedded in the elastomeric material. Rather, as may be seen from FIG. 7 and 8 a pressure sensor 84 is mounted in the lower part of a housing 62 having just its pressure receiving top surface in contact with elastomeric material 83. Thus, the arrangement is similar to the force measuring device according to the embodiment of FIG. 4.

Specifically, FIG. 7 shows an embodiment of a pressure measuring device where in the relatively flat housing 164 there is provided a recess 186 which is much wider than the recess 146 of the embodiment of FIG. 6. The top surface of a correspndingly wide piston 181 flushes with the top surface of the housing 164. As with the embodiments of FIG. 4 and 6 the lower main surface of the piston 181 is conically formed to assist removal of air bubbles during manufacture.

With the embodiment of FIG. 8 any piston is omitted. Thus, the total recess 186 is filled wlth elastomeric material 183. Of course, a completely embedded piston (FIG. 6) could be used as well.

With the embodiments of FIG. 7 and 8 the recess 186 is provided with a central opening 182 at its bottom the diameter thereof being preferably slightly smaller than the diameter of a ceramic pressure sensor 184 fitting into the bottom part of the housing 162. Exemplary, the pressure sensor 184 is fixed in the bottom part of the housing 162 by means of screws 188. The ciruit board 152 and the cover plate 151 correspond to those of the embodiment of FIG. 6.

By means of flanges 64 the pressure measuring device according to FIG. 7 and 8 may be secured to a wall of a container or the like in opposition to an opening permitting pressure P to act onto the top surface of the piston 181 or of the elastomeric material 183, respectively.

The pressure measuring devices according to FIG. 6 to 8 a preferably manufactured according to the method described above.

Suitable types of pressure sensors may be used, as thick layer ceramic diaphragms, Gas Hall generators, piezo-electric and piezo-resistive elements. The pressure measuring device according to the invention is particularly adapted for measuring pressures in liquids and gases in a pressure region between 2 and 400 bars.

According to another aspect of the present invention force measuring devices are designed such that they are particularly adapted to be used for supporting a scale platform of a truck or car weighing apparatus or for supporting of huge bins or coal bunkers for determining the weight of a truck or the conents of the bin, respectively. With such apparatuses force measuring devices must have a certain resiliency or loose which enables vertical, horizontal or angular movements of the bin or the platform. On the other hand, such movements should be limited in order to prevent damaging of the force measuring device. In this connection, it has become known to permit a lateral movement of the force measuring device by mounting it on a spherical projection and by providing an upper force introduction means in the form of a spherical recess into which a sphere or ball is placed. Despite these measures it is still necessary to support the force measuring device by levers and bumpers or abutments against overloading due to angular and horizontal forces. Also, it has become known to provide an elastomeric plate as an intermediate layer at the force introduction point. However, a static friction must be overcome which is in the range of 5%. Such a static friction deteriorates the accuracy and overloads the force measuring cells in lateral direction. Again, equalizing elements as levers or the like were necessary.

Figure 9:
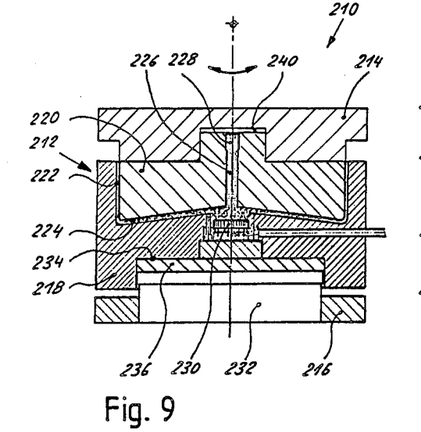
FIGS. 9 are schematic sectional side views of embodiments of to 11 the force measuring device according to the invention provided with specific means for equalizing lateral forces.
Figure 10:
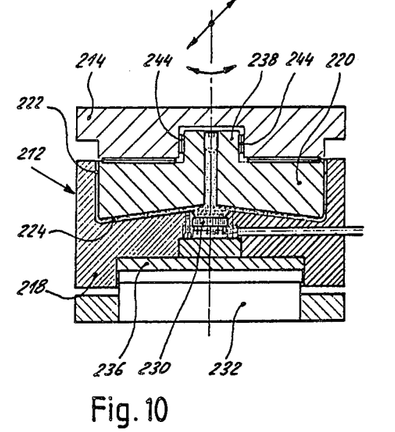
Figure 11:
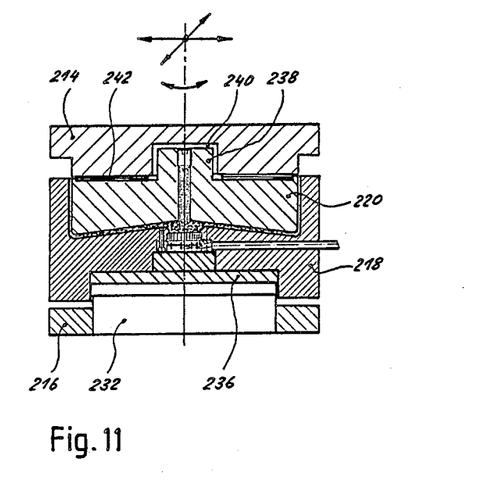

FIGS. 9 to 11 show embodiments of a force measuring device using the principles as explained before but having a specific design for equalizing lateral and/or rotational overloading of the force measuring device when used in connection with truck weighing devices or as a support for bins.

Further requirements for such types of force measuring devices are small height and simple design.

FIGS. 9 to 11 show embodiments having different resiliency or loose in lateral and/or rotational direction.

According to the FIGS. 9 to 11 a force measuring device 210 of the embodiments comprises an elastostatic force measuring device 212 similar to that explained in connections with FIGS. 2 to 4. Again, the elastostatic force measuring device 212 comprises a potlike 218 into which a piston 220 is inserted forming a relatively narrow annular gap 222 with the interior cylindrical surface of the potlike body 218. The annular gap 222 and the bottom of the potlike body 218 are filled with elastomeric material.

It should be noted that in contrast to the embodiments of FIGS. 2 to 4 the lower main surface 224 of the piston 220 has no conical projection but a concial recess with the bottom surface 224 ending in a central bore 226 through the piston 220 which bore 226 is closeable exemplary by a screw 228.

With the specific design of the force measuring device 212, in manufacture any air bubbles are urged into the central bore 226 and may escape at its upper end which is closed at the end of the manufacturing process. By avoiding the projecting cone of the embodiments of FIGS. 2 to 4 the height of the force measuring device is further reduced.

A pressure sensor 230 is mounted in contact with the elastomeric material provided at the bottom of the potlike body 218 in a similar manner as explained in connection with FIGS. 4 and 6 to 8.

Each of the embodiments of FIGS. 9 to 11 comprise a base part 216 having an upwardly projecting central piston 232 which engages a recess 234 complementary to the piston provided at the bottom side of the potlike body 218. The piston 232 urges against a disk 236 made of elastomeric material.

At its top side the piston 220 is provided with a central projection 238 engaging a corresponding recess 240 provided at the bottom side of a force introduction element 214. The force introduction element 214 may have a plane upper surface connected in any suitable manner to parts of the bin or a weighing platform. The plane design of the force introduction element 14 permits a stable connection to the bin or the weighing platform, respectively, and a uniform force introduction.

It should be noted, that with the embodiment according to FIG. 9 the piston 220 could be unitary with the force introduction element 214 since the force measuring device according to this embodiment only offers a resiliency or loose permitting a limited tilting of the bin or weighing platform, respectively.

Additionally, with the embodiment according to FIG. 11, there is a further resiliency or loose in both the direction and the Y-direction as indicated by the arrows at the top of the FIG.. For this purpose a disk or layer 242 of synthetic material is interposed between the force introduction element 214 and the piston 220. The synthetic material may preferably be Teflon, such that there is small friction between the metal surfaces of the force introduction element 214 and of the piston 220. It should be noted that with this embodiment (FIG. 11) there is a sufficient distance between the surfaces of the projection 238 and of the recess 240, which distance permits a horizontal movement of the force introduction element 240 relative to the force measuring device 212. Preferably, the disk 242 is placed in flat recesses provided at the upper surface of the piston 220 and/or the bottom surface of the force introduction element 214.

With the embodiment of FIG. 10 a lateral movement of the force introduction element 214 relative to the force measuring device 212 is possible in only one direction, f.i. the X-direction. In contrast to the embodiment according to FIG. 11 there is no free annular space around the projection 238. Rather, with the projection 238 and the recess 240 having a rectangular, preferably square-like cross section, at two opposite sides there is provided a free space between opposing surfaces of the projection 238 and the recess 240 whilst at the other opposite sides the space is filled by Teflon material 244 such that a movement of the force introduction element 214 in respect of the force measuring device 212 is possible only in a direction normal to the plane of the drawing. The disk 242 and the teflon material 244 may be provided with lubricating recesses offering the storage of lubricating material for permanent lubrication of the sliding surfaces.

It should be noted that the embodiments of FIGS. 10 and 11 provide the same resiliency as the force measuring device according to FIG. 9 in addition to their resiliency in lateral direction. However, there may be cases where force measuring devices may be used having only a lateral resiliency in one or both directions.

It will be appreciated that the combination of the piston 232 with the elastomeric disk 236 in the recess 234 constitutes a potlike bearing which, in principle, is a fixed bearing, however, permitting rotational or tilting movements about a horizontal axis which is possible due to the deformation of the elastomeric disk 236. The volume of the elastomeric material of the disk 236 is maintained constant independent of pressure application. Thus it is incompressible. The piston 232 prevents any squeezing out of the elastomeric material of the recess 234.

For supporting a huge bin or bunker or a weighing platform appropriate support means will be selected. Exemplary for a three point support the following devices are necessary:

One force measuring device according to FIG. 9,
one force measuring device according to FIG. 10, and
one force measuring device according to FIG. 11.

Using four support bearings an additional force measuring device according to FIG. 11 is necessary.

It should be noted, that the force measuring device 212 of the embodiment of FIGS. 9 to 11 may be replaced by other force measuring devices, in particular according to the FIGS. 1 to 4. The force measuring device 212 has the advantage of a relatively large height of the gap 222 with a decreased overall height of the device.

With all three embodiments essentially similar elements may be used; this simplifies the manufacture and handling of the devices according to the invention.

As initially explained, it is an advantage of the force measuring device according to the invention that any lateral forces are transmitted by the elastomeric material in the annular gap 222 from the piston 220 to the potlike body 218 and the base part 216. Only considerably increased forces which overcome the friction between the metalic surfaces of the force introduction element and the piston and the Teflon material displace the force introduction element 214 in respect of the force measuring device 212. Since there is no sagging of the piston or the base part, there is, in turn, no tilting of the bin or the weighing platform. Force measuring devices according to the invention may be loaded in the range of 100 tons and may have a diameter of 200 mms. The central projection 238 at the topside of the piston 220 and the central recess 240 of the force introduction element 214 may be replaced by an annular arrangement having the same function. Also, any other complementary combination may be used.

In the foregoing force measuring devices has been explained in connection with FIG. 9 to 11 which in view of the considerable gap areas may compensate considerable lateral forces. Even with a large overloading the force measuring device would not be destroyed, but the relative movement is limited by the engagement of the cylindrical surface of the piston at the interior cylindrical surface of the potlike body.

When manufacturing the force measuring devices according to FIGS. 9 to 11 there is a further advantage that when rotating the devices with an apparatus according to FIG. 5 the sectional angle for a predetermined large diameter of a force measuring device may be smaller than for devices having the bottom main surface of the piston formed as a projecting cone.

We claim:

1. A force or pressure measuring device comprising:
a force or pressure receiving member and a support member spaced therefrom, one said member having a peripheral rim and the other member being formed as a piston fitted into said rim so as to form a narrow annular gap between an inner peripheral surface of said one member and an outer peripheral surface of the other said member, an inner face surface of the other said member being slightly connically recessed toward a central opening extending axially through said other member and closeable by blocking means;
elastomeric material provided in the space between and adhering to said members, said elastomeric material essentially filling said gap and said central opening; and
a pressure sensor in said space in contact with said elastomeric material.

2. The force or pressure measuring device of claim 1 wherein said elastomeric material is essentially bubble-free.

3. A force or pressure measuring device of claim 2 wherein said elastomeric material has been made essentially bubble-free in situ.

4. The force or pressure measuring device of claim 1 wherein said pressure sensor is removably insertable into a recess provided in said support member for contacting said elastomeric material through an opening provided at a bottom surface in said support member said opening having a smaller diameter than a pressure receiving surface of said pressure sensor.

5. A pressure measuring device comprising:
a support member having a rigid metal body, a recess extending over a major part of a top surface of said body;
essentially bubblefree elastomeric material filled in said recess;
a pressure sensor in contact with said elastomeric material; and
circuit means arranged in a further recess in said body for connecting leads of said pressure sensor to a communication cable fixed at said body.

6. The pressure measuring device of claim 5 wherein said pressure sensor is completely embedded in said elastomeric material.

7. The pressure measuring device of claim 5 wherein said recess in said body is cylindrical and a piston is inserted in said recess forming a narrow annular gap to an interior surface of said cylindrical recess.

8. The pressure measuring device of claim 7 wherein said piston is embedded in said elastomeric material.

9. The pressure measuring device of claim 7 wherein said piston flushes with its outer face surface with said top surface of said body.

10. The pressure measuring device of claim 7 wherein an inner face surface of said piston is formed as a slightly conical projection.

11. The pressure measuring device of claim 7 wherein an inner face surface of said piston has a slightly conical recess and said piston being provided with a central bore extending axially therethrough and closeable by a blocking means.

12. The pressure measuring device of claim 5 wherein at the bottom of said recess of said body there is provided an opening, said pressure sensor being removeably insertable into a further recess in said body for contacting said elastomeric material through said opening.

13. The pressure measuring device of claim 12 further comprising fixing means for mounting said pressure sensor in said further recess and closure means for tightly sealing said further recess after insertion of said pressure sensor.

14. The pressure measuring device of claim 12 further comprising circuit board means arranged in said further recess for connection to leads of said pressure sensor and to an input/output cable.

15. The pressure measuring device of claim 5 wherein said body is provided with fixing means for securing said pressure measuring device at an opening of a utilizing device.

16. A force measuring device comprising:
a force receiving member and a support member spaced therefrom, one said member having a peripheral rim and the other said member being fitted into said rim so as to form a narrow and annular gap between an inner peripheral surface face of said rim and an outer peripheral surface of the other said member;
elastomeric material provided in the space between and adhered to said members said elastomeric material essentially filling said gap;
a pressure sensor in said space in contact with said elastomeric material;
a base member provided with a flat upward projection forming a piston fitting in a bottom side recess of said support member said projection and said recess being complementary to each other and concentrically aligned to a longitudinal axis of said force measuring device; and
a disk of synthetic material inserted in said recess and bearing against a top surface of said projection when said support member is placed on said base member.

17. The force measuring device of claim 16 wherein between a plane top surface of said force receiving member a disk of synthetic material is provided supporting a force introduction member having essentially parallel plane upper and lower main surfaces.

18. The force measuring device of claim 17 wherein an upper surface of said force receiving member is provided with a concentric projection of a rectangular cross section, a layer of synthetic material being located on plane areas of said top surface around said projection and further comprising a force introduction member having provided a recess at a lower plane surface complementary to said projection of said force receiving member, an annular gap being provided between an interior surface of said recess and an exterior surface of said projection, said gap being filled at two opposing sides of said projection with synthetic material whilst the other two opposing sided of said gap are empty.

19. A force or pressure measuring device comprising:
a force or pressure receiving member and a support member spaced therefrom, one said member having a peripheral rim and the other said member being fitted into said rim so as to form a narrow and annular gap between an inner peripheral surface of said rim and an outer peripheral surface of said other member;
elastomeric material provided in the space between and adhered to said members, said elastomeric material essentially filling said gap and being essentially bubblefree; and
at least one pressure sensor arranged in said space in contact with said elastomeric material.

20. The force or pressure measuring device of claim 19 wherein said elastomeric material has been made essentially bubblefree in situ.

* * * * *